(12) United States Patent
Dispenza et al.

(10) Patent No.: US 6,882,411 B2
(45) Date of Patent: Apr. 19, 2005

(54) METHOD AND SYSTEM FOR INSPECTING OPTICAL DEVICES

(75) Inventors: Anthony J. Dispenza, Jacksonville, FL (US); James Ebel, Tallahassee, FL (US); Kevin Giles, Knoxville, TN (US); Michael F. Widman, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 38 days.

(21) Appl. No.: 10/371,712

(22) Filed: Feb. 21, 2003

(65) Prior Publication Data
US 2004/0042003 A1 Mar. 4, 2004

Related U.S. Application Data

(60) Provisional application No. 60/359,074, filed on Feb. 21, 2002.

(51) Int. Cl.[7] .................................................. G01B 9/00
(52) U.S. Cl. ..................................... 356/124; 356/239.2
(58) Field of Search ........................... 356/237.1–237.5, 356/124–127, 239.1, 239.2, 240.1; 348/125, 127; 382/100, 32.1; 250/223 R, 223 B

(56) References Cited

U.S. PATENT DOCUMENTS

| | | | |
|---|---|---|---|
| 5,500,732 A | * | 3/1996 | Ebel et al. ................... 356/124 |
| 5,578,331 A | * | 11/1996 | Martin et al. ................ 425/445 |
| 5,649,410 A | | 7/1997 | Martin et al. |
| 6,577,387 B1 | | 6/2003 | Ross, III et al. |
| 6,580,502 B1 | * | 6/2003 | Kuwabara ................. 356/237.3 |
| 6,765,661 B1 | | 7/2004 | Biel et al. |

FOREIGN PATENT DOCUMENTS

EP          0 686 842 A      12/1995

OTHER PUBLICATIONS

PCT International Search Report, dated Jul. 1, 2003, for PCT Int'l. Appln. No. PCT/US03/05356.

* cited by examiner

Primary Examiner—Hoa Q. Pham
(74) Attorney, Agent, or Firm—Ruby Hope

(57) ABSTRACT

The invention includes methods and apparatuses for inspecting optical devices, particularly contact lenses.

28 Claims, 8 Drawing Sheets

METHOD AND SYSTEM FOR INSPECTING OPTICAL DEVICES

RELATED APPLICATION

This application claims priority from a provisional application U.S. Ser. No. 60/359,074, filed on Feb. 21, 2002, and entitled "Method and System For Inspecting Optical Devices."

FIELD OF THE INVENTION

This invention generally relates to inspecting optical devices or media, such as ophthalmic lenses. More specifically, the invention relates to such systems for automatically inspecting optical devices and to techniques and procedures that are well suited for use in such systems.

Over the last several years, automated techniques have been successfully developed for inspecting ophthalmic lenses, particularly contact lenses. Such techniques are disclosed, for example, in U.S. Pat. No. 5,500,732 and U.S. patent application Ser. No. 09/751,875, filed Dec. 29, 2001.

Generally, in these techniques, radiation, which may be ultraviolet light, visible light, or a laser, is directed through a lens to form an image of the lens on a pixel array. Digital data values are produced that represent the intensity of the radiation on the pixels of the array, and a computer is used to process those data values to determine if the lens has any unacceptable flaws or defects. Any lens that has such a flaw or defect is then identified and rejected.

Many of these techniques are very effective at insuring that any lens that has an unacceptable flaw or defect is rejected. At the same time, these techniques sometimes reject acceptable lenses, a result referred to as false rejects. One reason for this is that many of the procedures are not able to distinguish between certain types of lens defects and other features that may appear on the pixel array but which are not lens defects.

When an inspection system detects a feature on the pixel array but cannot determine whether that feature is a lens defect or another indistinguishable but acceptable feature, the lens is rejected. For instance, with several inspection techniques, the lenses are inspected while submerged in a liquid solution, and it is very difficult to distinguish between holes in a lens (which are unacceptable) and bubbles in that liquid solution (which are not a lens defect). As a result, acceptable lenses may be rejected because of bubbles in the liquid solution.

As another example, with prior art automated lens inspection systems, it is very difficult to distinguish between molded contact lenses that have tears or holes and molded contact lenses that simply have been slightly pulled away from a mold section. To elaborate, contact lenses may be made, for example as disclosed in U.S. Pat. No. 5,540,410, by molding a suitable polymer between two plastic mold sections. After the polymer partially hardens, one of the mold sections is pulled away from the other mold section to provide access to the lens.

In this process, as a lens is made, holes or tears may develop in the lens. Also, as the mold sections are pulled apart, a lens may become delaminated—that is, the edge of the lens may pull away slightly from the mold section in which the lens remains. It is very difficult for an automated inspection system to distinguish between a lens that has just slightly pulled away from the mold section (which is not a lens defect), and a lens that has a hole or is torn (which is a lens defect). Because of this, acceptable lenses may be rejected.

OBJECTIVES OF THE INVENTION

Figure 1:
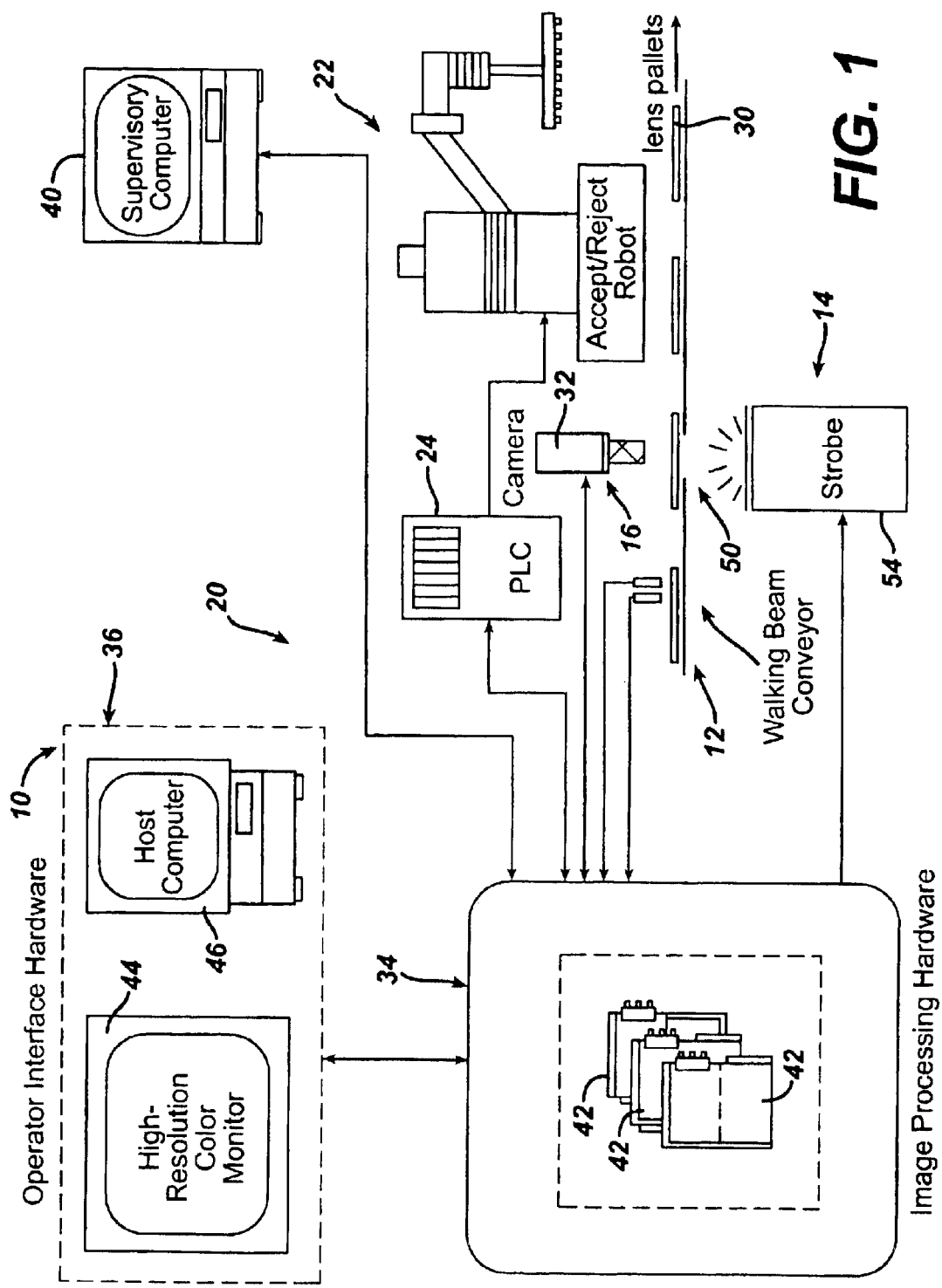
FIG. 1 is a block diagram generally illustrating a lens inspection system that may be used in the practice of the present invention.

An object of this invention is to improve systems for inspecting optical devices. Another object of the present invention is to reduce the percentage of false rejects in an automated lens inspection system.

A further object of the invention is to provide an automated system for inspecting optical devices that is able to identify certain features more accurately. A further object of the invention is to provide an automated lens inspection system having an improved ability to distinguish between holes in the lenses and bubbles in liquid solutions in which the lenses are submerged.

Another object of this invention is to illuminate a lens that is submerged in a liquid, in a way that facilitates distinguishing between holes in the lens and bubbles in the liquid. A further object of the invention is to provide an image analysis technique that can distinguish between images of a hole in an ophthalmic lens and images of bubbles in a liquid in which the lens is submerged. Another object of this invention is to illuminate a lens in such a way that delamination of the lens is not shown, while hole and tears in the lens are shown.

A further object of the present invention is to provide an illumination technique, referred to as spectral masking, that illuminates objects with light in different, separate wavelength bands. Alternatively, the object may be illuminated by light comprising the separate wavelength bands and additional bands; however, the imaging system is sensitive to only the separate wavelength bands, or the wavelengths of light that are not desired are filtered out prior to the imaging system. Another objects of this invention is to provide spectral masking techniques that may be used to enable a lens inspection system to identify certain features more accurately.

A further object of the present invention is to illuminate different portions of an optical device with different wavelength bands. Still another object of the invention is to illuminate a central portion of a molded contact lens in a way that shows whether holes or tears are present in that portion of the lens, without illuminating outer portions of the lens in the same way.

These and other objectives may be attained with the inspection and analysis procedures disclosed herein. Generally, these procedures employ, or are used with, a unique illumination technique, referred to as spectral masking, in which an optical device is illuminated with plural wavelength bands. With one spectral masking technique, the entire optical device is illuminated with two separate bands, which may be part of a continuous spectrum of light; and in another spectral masking technique, different regions of the optical device are illuminated with different bands. The former technique may be used to differentiate between bubbles in solution and holes in the optical device, which is particularly well-suited for analyzing lenses in solution in a package; however, the technique may also be used to find holes in a lens in a mold piece. This invention is useful in inspecting very thick lenses, e.g.—6 lenses or higher that are too thick to be analyzed using a uv inspection method alone. The spectral masking technique that illuminates the optical device with different bands at different regions of the device is particularly well-suited for analyzing contact lenses in a mold piece and may be used to avoid rejecting acceptable lenses simply because they are delaminated.

More specifically, in accordance with a first aspect of the invention, a method and system are provided for imaging an optical device such as an ophthalmic lens. In the image formed with this procedure, images of bubbles and holes have discernible differences. This method is a plural-spectral imaging/inspection method for an object whereas the object has varied spectral absorption levels comprising at least one illumination source comprising wavelengths that are at least partially absorbed, preferably mostly absorbed and wavelengths that are at least partially transmitted, preferably most transmitted by the object to produce a partially translucent image.

With the preferred embodiment, the technique relies on the ultraviolet absorption qualities of an ultraviolet inhibitor in the lens to create the desired translucent/shaded effect. The effect is achieved by passing specific bands of filtered ultraviolet and visible light in the appropriate ratio and intensities through the lens. The spectral bands are selected in such a manner that a portion of the ultraviolet light is absorbed by the lens and a portion of the visible light is allowed to pass through the optical device.

In accordance with a second aspect of the invention, a procedure is provided to distinguish between holes in optical devices and bubbles in a liquid solution. In this procedure, an image of the device is formed, and the formed image may include a feature that is either a hole or a bubble. A characteristic is identified that distinguishes the image of a hole from the image of a bubble. A set of data values representing the formed image is processed, according to a predetermined program, to search for that distinguishing characteristic, and if it is found, the characteristic is used to classify the feature as either a hole in the optical device or a bubble in the liquid solution. The preferred embodiment of the procedure, described in detail below, employs three key elements to discriminate bubbles from holes: symmetry, wall thickness, and intensity and intensity ratios.

In accordance with a further aspect of the invention, a spectral masking technique is provided that may be used to avoid rejecting acceptable molded contact lenses simply because they are delaminated. In particular, this technique effectively eliminates, or substantially reduces, the false negatives caused by an inability to distinguish between delaminated lenses and lenses that have holes or tears. In a preferred application, also described in detail below, outer regions of the lens are illuminated in such a way that any delamination of the lens is not shown, while a central region of the lens is illuminated in a wavelength that shows holes or tears in that portion of the lens.

Further benefits and advantages of the invention will become apparent from a consideration of the following detailed description, given with reference to the accompanying drawings, which specify and show preferred embodiments of the invention.

DETAILED DESCRIPTION OF THE INVENTION

The invention includes a method of inspecting optical devices comprising (a) illuminating the optical device and a surrounding background with light, wherein said light comprises a first wavelength band and a second wavelength band,
  wherein said first wavelength band and said second wavelength band are different wavelengths, and
  wherein said first wavelength band has a first intensity and said second wavelength band has a second intensity;

(b) transmitting said light through said optical device wherein the majority of said first wavelength band is absorbed by said optical device and the majority of the second wavelength band is transmitted through said optical device, and capturing said lens transmitted light on a photo-sensitive pixel array;

(c) transmitting said light through said surrounding background wherein the majority of said first wavelength band and said second wavelength band are transmitted, and capturing said background transmitted light on a photo-sensitive pixel array (d) reading pixels generated from step (b) and step (c) and comparing the gray scale values of said reading, wherein the difference between the grayscale values of the pixels generated from said background transmitted light and from said lens transmitted light is of sufficient value to distinguish between holes in said optical device and bubbles in said surrounding background.

As used herein the term "optical device" includes but is not limited to hard contact lenses, soft contact lenses, rigid gas permeable contact lenses, intra-ocular lenses, lenses for microscopes, lenses for cameras and lenses for eyeglasses. The optical devices inspected in this invention may or may not contain vision correction. The preferred optical devices are soft contact lenses with or without vision correction. Soft lenses may be made of conventional hydrogels and are generally prepared from monomers including but not limited to hydroxyethyl methacrylate (HEMA), vinyl pyrrolidone, glycerol methacrylate, methacrylic acid and acid esters; or silicone hydrogels. Examples of soft contact lenses include but are not limited to etafilcon A, genfilcon A, lenefilcon A, polymacon, acquafilcon A, balafilcon A, lotrafilcon A and silicone hydrogels as prepared in U.S. Pat. No. 5,998,498, U.S. patent application Ser. No. 09/532,943, a continuation-in-part of U.S. patent application Ser. No. 09/532,943, filed on Aug. 30, 2000, U.S. patent Ser. No. 09/957,299 filed on Sep. 20, 2001, U.S. Pat. No. 6,087,415, U.S. Pat. No. 5,760,100, U.S. Pat. No. 5,776,999, U.S. Pat. No. 5,789,461, U.S. Pat. No. 5,849,811, U.S. Pat. No. 5,965,631, U.S. Pat. App. No. 60/318,536, entitled Biomedical Devices Containing Internal wetting Agents," filed on Sep. 10, 2001 and its non-provisional counterpart of the same title, filed on Sep. 6, 2002. These patents as well as all other patent disclosed in this application are hereby incorporated by reference in their entirety.

In addition to the monomer mixes for soft contact lenses, the lenses may contain other materials. Without limitation, other materials in this regard preferably include one or more ultraviolet (UV) absorption additives. These can be included in the monomer mix thereby rendering the resultant optical device having particular absorptive properties. By way of example only, UV absorbers of this kind include NOR-BLOCK (commercially available from JANSSEN). While the amount of such absorbers can vary, depending also on the type of final absorption behavior sought, it is typical that such absorbers are present in an amount of approximately 1 part absorber per hundred parts monomer. Other absorptive materials include tints, the color of which can be correlated by those in the art to obtain absorption of other particular wavelengths, e.g. yellow light would be absorbed by a lens having a blue tint. In the cases of As used herein, the term "surrounding background" refers to any object that transmits light and physically supports the optical device during inspection. If the optical device is a soft contact lens, an example of a surrounding background includes but it not limited to the packaging for the lenses or the mold used to prepare the lens. Most processes used to prepare optical devices, particularly soft contact lenses are wet processes, where packing solution, deionized water and other solutions are used throughout the processing steps. Typically when a soft contact lens is inspected, the lens is submerged or floating in a liquid. Therefore for purposes of this invention, if an optical device is inspected while submerged or floating in a liquid, the term surrounding background includes this liquid. With respect to molds for the lenses, they are constructed from plastics serviceable as materials that include without limitation: polyolefins, such as low-density polyethylene, medium-density polyethylene, high-density polyethylene, polypropylene, and copolymers of polypropylene and polyethylenes aforesaid; polystyrene; poly4-methylpentene; polyacetal resins; polyacrylether; polyarylether; sulfones; Nylon 6; Nylon 66; Nylon 11; thermoplastic polyester; and various fluorinated materials such as the fluorinated ethylene propylene copolymers and ethylene fluoroethylene copolymers. Molds for the lenses are often of two-part construction containing corresponding female and male parts (front curve and back curve respectively). If the lenses are inspected in mold, it is preferred that the mold is separated into its parts and that the lens be inspected in the front curve.

As used herein the term "first wavelength band" refers to light of a wavelength in the ultraviolet region of the spectrum that is absorbed by the optical device. The light need not be completely absorbed by optical device, just the majority of said first wavelength band must be absorbed. It is preferred that about 51% to about 100% of said first wavelength band be absorbed, more preferably, about 80% to about 100%, even more preferably, about 90% to about 99%, and most preferably about 99%.

With respect to the wavelength of said first wavelength band, this is determined by the composition of the optical device and its light absorbing properties. For example if the optical device absorbs about 98 to about 99% of light having a wavelength of about 340 nm to 360 nm, said first wavelength band will be from 340 nm to about 360 nm.

As used herein the term "second wavelength band" refers to light of a wavelength in the visible region of the spectrum that is transmitted by the optical device. The light need not be completely transmitted by optical device, just the majority of said second wavelength band must be transmitted. It is preferred that about 51% to about 100% of said second wavelength band be transmitted, more preferably, about 80% to about 100%, even more preferably, about 90% to about 99%, and most preferably about 98 to about 99%.

The wavelength of this second wavelength band is determined by transmittance properties of the optical device, where wavelengths corresponding to the appropriate percentage of transmittance of light are used. For example if the optical device transmits greater than 98% of incident light at a wavelength of about 385–405, the preferred wavelength for the second wavelength band is about 385 nm to about 405 nm.

The optical device may be illuminated with said first wavelength band and said second wavelength band by two separate sources of light, where one light has said first wavelength and the other has said second wavelength. However, the same result can be achieved using one source of light which contains a range of wavelengths and using one or more appropriate filters to emit light of the desired first and second wavelengths.

As used herein the "first intensity" is of said first wavelength band and the "second intensity" is of said second wavelength band. The ratio of the average first average intensity band to the average second intensity band is adjusted so that the ratio of the average first intensity to the average second intensity is between about 1:1 to about 2:1, and more preferably about 1.5:1.

As used herein, the term "photosentive pixel array" has its common industry definition. As used herein the term "gray scale value" refers to a brightness scale for images or their corresponding pixel reading, where the higher the number the brighter (or whiter) the image, and the lower the number, the darker (or blacker) the image. As used in this invention, the gray scale value of the white surrounding background is about 255 and the gray scale value for a black image is about 0. The difference between the gray scale value of a defect free region (no holes, tears, or debris)of optical device and the gray scale value for the surrounding background is about 120 to about 180, preferably about 130–160, most preferably about 140. An image (or corresponding pixel reading) having the aforementioned difference between the gray scale values of the surrounding background and a defect free region of optical device has a translucent/shaded appearance that discriminates between the appearance of holes in the optical device and bubbles in the surrounding solution.

As used herein, "holes" refer to an area of the optical device wherein the material which comprises the device is missing. "Bubbles" as used herein are small bodies of gas with the liquid mediums that surrounds or otherwise wets the optical device.

Further the invention includes a method of inspecting optical devices comprising (a) illuminating the optical device and a surrounding background with light, wherein said light comprises a first wavelength band and a second wavelength band,
   wherein said first wavelength band and said second wavelength band are different wavelengths, and
   wherein said first wavelength band has a first intensity and said second wavelength band has a second intensity;
(b) transmitting said light through said optical device wherein the majority of said first wavelength band is absorbed by said optical device and the majority of the second wavelength band is transmitted through said optical device, and capturing said lens transmitted light on a photo-sensitive pixel array;
(c) transmitting said light through said surrounding background wherein the majority of said first wavelength band and said second wavelength band are transmitted, and capturing said background transmitted light on a photo-sensitive pixel array (d) producing an image of said optical device and said surrounding background wherein the difference between the gray scale value of the image produced by step (c) and step (b) is of sufficient value to distinguish between holes in said optical device and bubbles in said surrounding background. As used herein, the terms optical device, surrounding background, first wavelength band, second wavelength band, first intensity, second intensity, photosensitive pixel array, gray scale value, hole and bubble all have their aforementioned meaning and preferred ranges.

As used herein, the term "image" refers to a human readable or machine readable optical counterpart of said optical device and said surrounding background. Said image may be projected on image plane, a computer screen or other viewing device. Further said image may be magnified, or otherwise focused to improve the ability of the reader to view said image. The invention is illustrated in further detail by the following drawings.

FIG. 1 illustrates inspection system 10 for inspecting contact lenses. System 10 generally comprising transport subsystem 12, illumination subsystem 14, imaging subsystem 16 and processing subsystem 20. FIG. 1 also shows reject mechanism 22, reject controller 24, and a plurality of lens carriers or pallets 30, each of which holds one or more lens packages. Preferably, imaging subsystem 16 includes camera 32; and processing subsystem 20 includes image processor means 34, operator interface means 36, and supervisory computer 40; and, more specifically, processor means 34 includes a plurality of processor and memory boards 42, and interface means 36 includes monitor 44 and host computer 46.

Generally, transport subsystem 12 is provided to move a multitude of ophthalmic lenses along a predetermined path and into a lens inspection position, referenced at 50 in FIG. 1. Illumination subsystem 14 is provided to generate a light beam which includes light comprising one or more bands that are at least partially absorbed and one or more different bands that are at least partially transmitted and to direct that beam through the lenses moving through the lens inspection position. Imaging subsystem 16 generates a set of signals representing the light beam, or portions thereof, transmitted through each inspected lens, and then transmits those signals to processing subsystem 20.

Processing subsystem 20 receives those signals from imaging subsystem 16 and processes those signals according to a predetermined program. Using this program, processing subsystem 20 generates a signal indicating whether each inspected lens is suitable for consumer use. If a lens is found to be unacceptable, a signal is transmitted to controller 24, which then operates mechanism 22 to remove the unacceptable lens from the stream of acceptable lenses. Specific devices or elements that may be used in system 10 are disclosed and described in detail in the above-mentioned U.S. Pat. No. 5,500,732 and U.S. patent application Ser. No. 09/751,875, both of which are herein incorporated by reference in their entireties.

Figure 2:
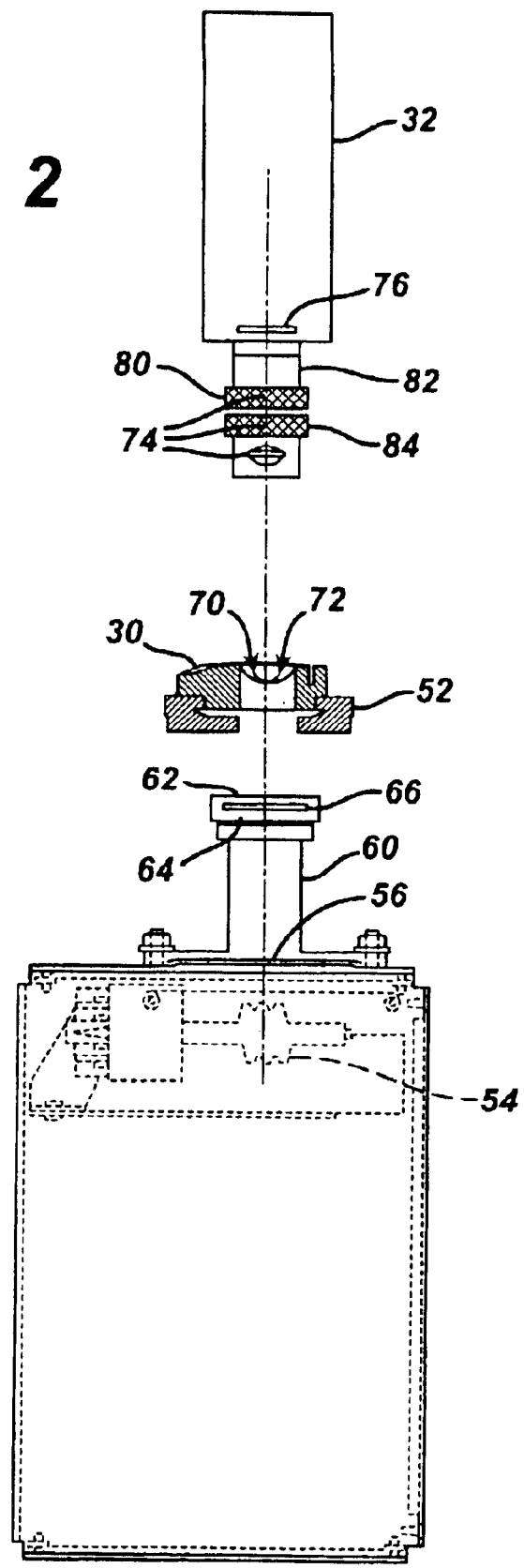
FIG. 2 shows portions of the illuminating and imaging subsystems of the inspection system shown in FIG. 1.

FIG. 2 illustrates in greater detail portions of the preferred lighting and imaging subsystems. In use, a trigger sensor (not shown) detects a carrier pack 30 moving along pack conveyor 52 and sends an electrical signal to the lighting subsystem, which in turn fires xenon strobe 54 (light source). Light produced by the strobe passes through diffusing glass 56 and migrates through light extension tube 60, where it encounters a combination of filters 62 and 64 in a filter holder 66. Newly filtered light continues on its course through the primary package 70, where the light encounters the contact lens in de-ionized water 72. Light emerging from the contact lens is received by the multi-element quartz lens 74 and optically processed before it impinges the camera CCD array 76. The resultant image data are then processed by the processing subsystem. FIG. 2 also shows a camera lens f-stop adjustment ring 80, a lens extension tube 82, and a lens focus ring 84.

The filters, 62 and 64 remove the wavelengths of light that are not within the first wavelength band or the second wavelength band. Preferably one of the filters is an IR filter with a peak transmission at 540 nm 300 FWHM (Full width at half max., or the width of the transmitting band of an optical filter measured at 50% of the peak transmission.) The second filter is preferably a uv filter, either a UV transmitting black glass filter that filters light at 350 nm 53 FWHM (UG1 filter) or a black glass filter that filters light at 324 nm 112 FWHM (UG11). The filters are described and shown in the preferred embodiments as being located between the light source and the device to be inspected; however, the filters may alternatively be located between the device to be inspected and the camera.

With reference to FIG. 1, in this operation of system 10, host computer 46, which preferably includes a keyboard and a video terminal, is connected to processor means 34 to display visually data or messages being input into the processor. Monitor 44 is also connected to processor means 34 and is provided to produce video images from the data values stored in the processor means, and monitor 44 may also be used to display inspection results and totals.

As mentioned above, processing subsystem 20 processes the data received from the pixel array 76 to determine whether each lens 70 is acceptable. Generally, this is done by searching the image of each lens for the presence of any defect, or more precisely, for the image of any defect. If a defect is found, the lens is then rejected.

One type of defect is a hole in a lens, and prior art inspection procedures typically search for such holes. A key disadvantage of the prior art technology, however, is its inability to discern accurately between bubbles in solution 72 and holes in a contact lens 70. This inability is due to the fact that these bubbles 42 and holes 43 have similar characteristics when imaged. This deficiency is a leading cause of falsely rejected product.

The illumination subsystem 14 is designed and operated to form an image on pixel array 76 in which bubbles and holes have discernable differences, and processing subsystem 20 is provided with a routine that can identify those differences and thereby distinguish between holes in the lenses and bubbles in the solution. More specifically, the illumination subsystem provides a plural-wavelength imaging method for the lens, whereas the lens has varied absorption levels, comprising at least one illumination source comprising wavelengths that are at least partially absorbed and wavelengths that are at least partially transmitted by the lens to produce a partially translucent image.

Figure 3:
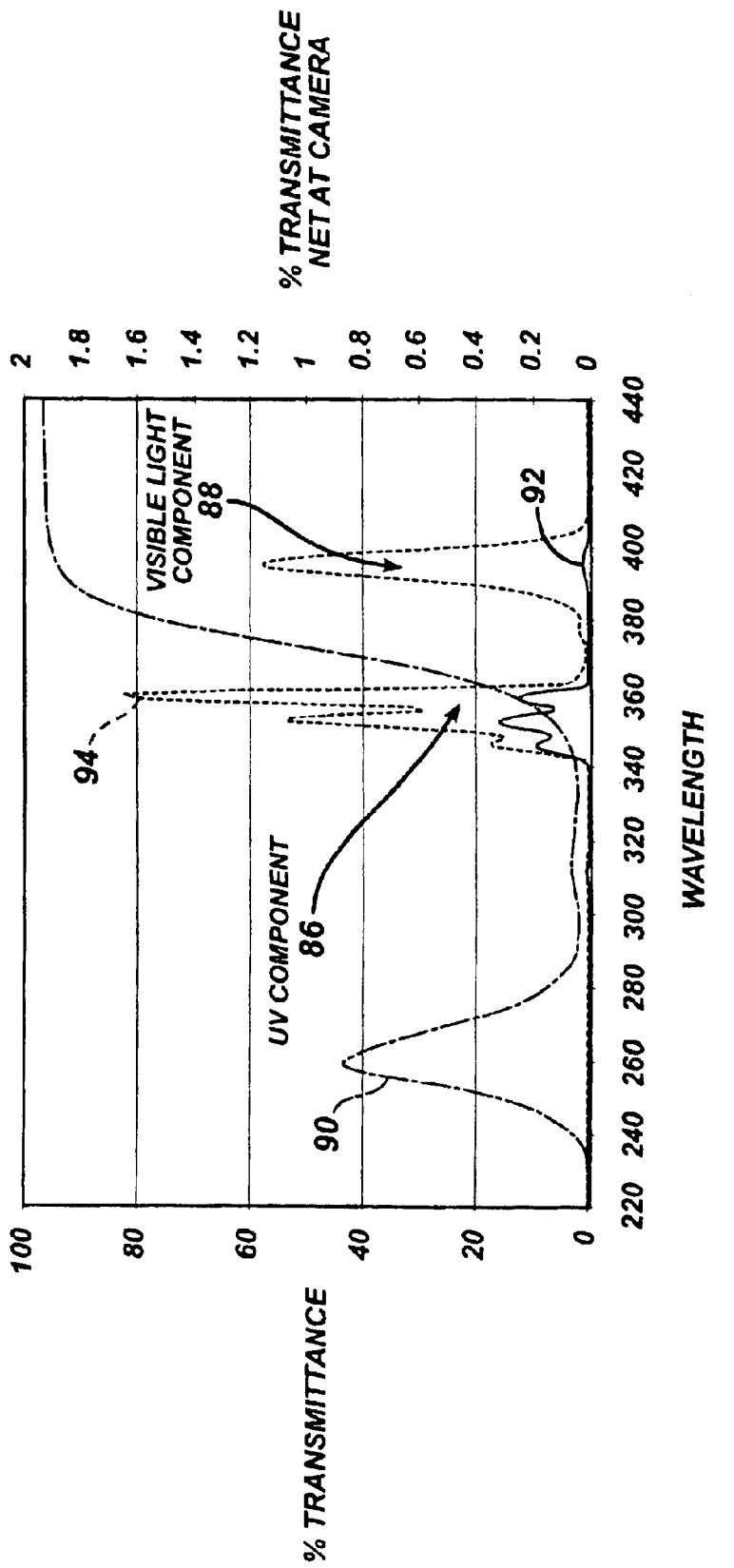
FIG. 3 shows spectral bands that may be used to illuminate a lens in the system of FIGS. 1 and 2.

In addition to the spectral qualities of the contact lens, this technique may add quantities of ultraviolet inhibitors to the remaining contact lens components to adjust the degree of absorbance of the wavelength band to achieve the desired translucent effect. With reference to FIG. 3, the effect is achieved by passing bands of filtered ultraviolet and visible light in the appropriate ratio and intensities through the lens, and the net result is bands 86 and 88. The spectral bands are selected in such a manner that a portion of the ultraviolet light is absorbed by the lens and a portion of the visible light is allowed to pass through the lens. The uv portion of the light that reaches the camera and is part of the light that forms the image on the CCD array preferably comprises 340–365 nm. (This uv portion of the light is measured after passing through the filters and the contact lens.) The visible portion of the light that reaches the camera and is part of the light that forms the image CCD array preferably comprises 385–405 nm. (This visible portion of the light is measured after passing through the filters and the lens.) The ratio of absorptive (ultraviolet light component) to non-absorptive (visible light component) is preferably between about 1:1 to 1.5:1 and more preferably 1.5:1.

Figure 4:
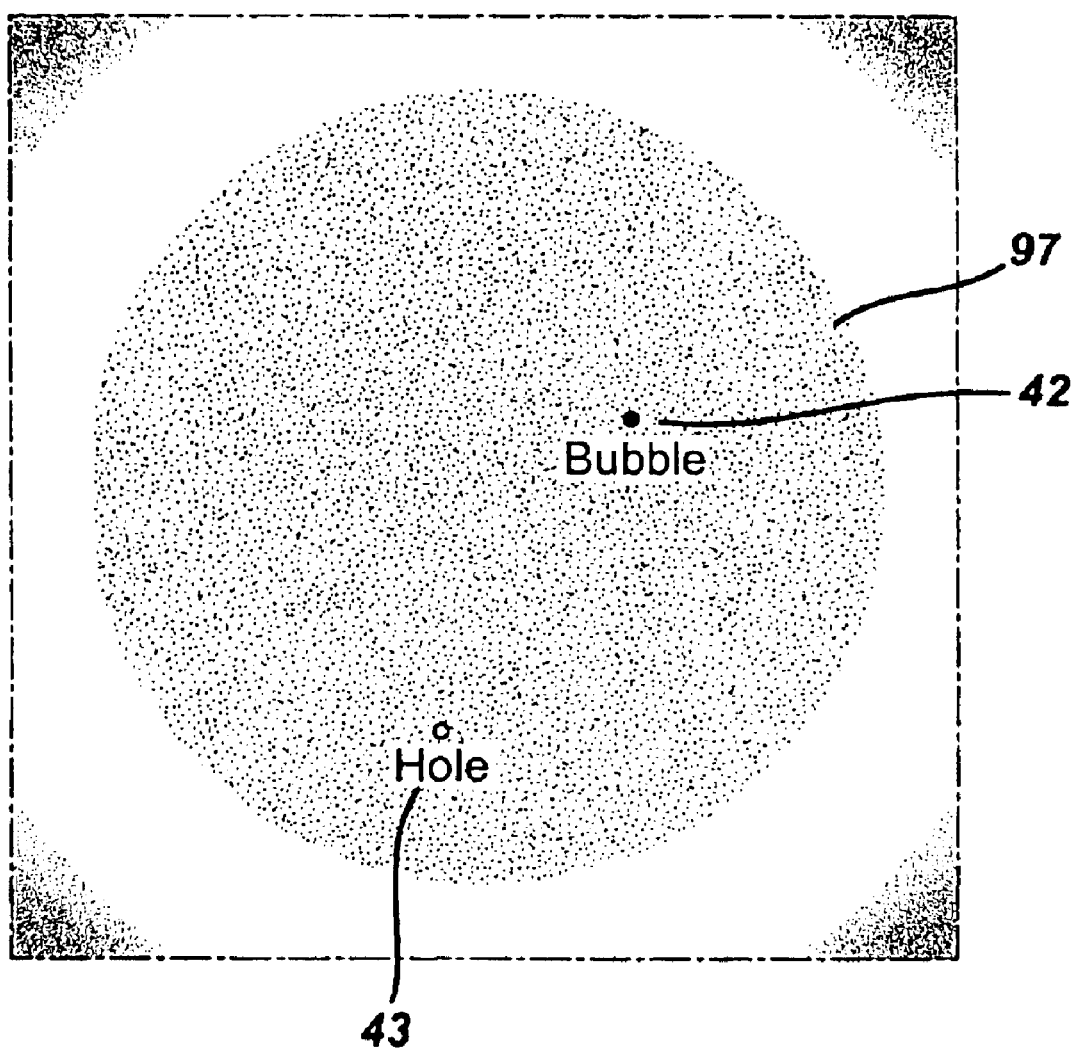
FIG. 4 shows a lens image made in the system of FIGS. 1 and 2 and using a first spectral masking technique.

Also, the system is adjusted so that the average intensity of the light comprising the said first wavelength band and said second wavelength band incident on the photo-sensitive pixel array is in the mid-range of the sensitivity of the array. For example if the corresponding gray scale reading range of the photo-sensitive pixel array is for example 0 to 255, the average intensity of the light incident on the photo-sensitive pixel array is adjusted to the middle of this range preferably about 140. In FIG. 3, line 92 ("———") represents the camera/filter transmittance, line 90 ("_ _ _ _") represents the lens absorption data without filters present, and line 94 ("_ _ _ _"), which includes bands 86 and 88, represents the net transmittance spectra at the camera after passing through the lens and filters. FIG. 4 illustrates a contact lens image 96 formed on the pixel array using this multi-spectral imaging technology. The contact lens image is a partially translucent image i.e. a gray image, 97. This image clearly distinguishes between bubble, 42, and hole 43. By contrast, a bright field inspection system creates a bright image of the contact lens in which the edge and defects are dark pixels, and a dark field inspection system creates a dark image of the contact lens in which the edge and defects are bright pixels.

Figure 5:
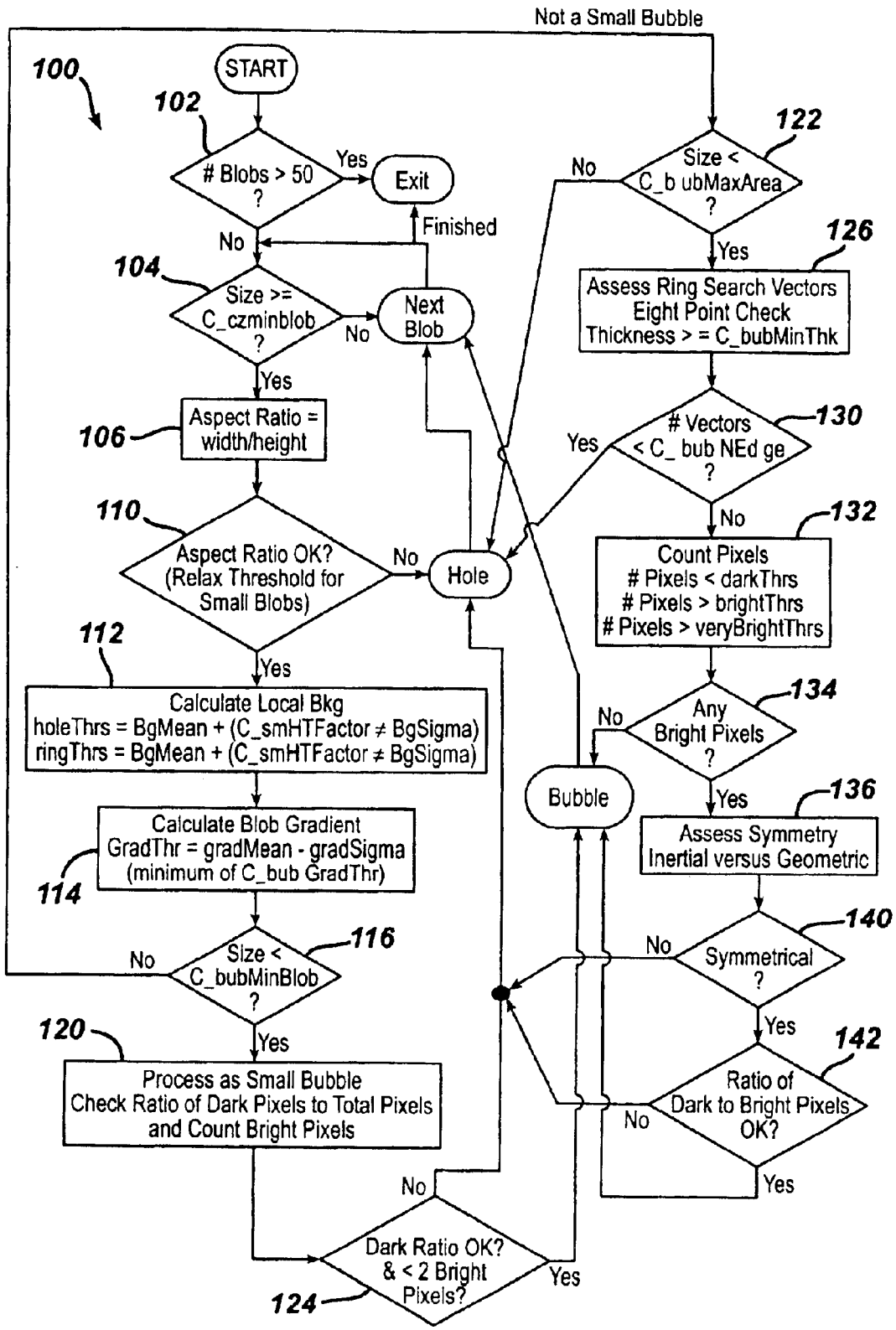
FIG. 5 is a flow chart for a preferred procedure for analyzing a lens image made using the first spectral masking technique.

FIG. 5 shows a flow chart for a routine or procedure 100 that is performed by the processing system using a computer program to analyze pixel information. The procedure, when used with a lens image formed in the above-described manner, is able effectively to distinguish between holes in the lenses and bubbles in the liquid in which the lenses are submerged. Generally, this procedure employs three key elements to discriminate bubbles from holes: symmetry, wall thickness, and intensity and intensity ratios. All the discrimination features can be used in any inspection system, e.g. bright field and dark field inspection systems as disclosed in U.S. Pat. Nos. 6,154,274; 5,995,213; 5,943,436; 5,828,446; 5,814,134; 5,812,254; 5,805,276; 5,748,300; 5,745,230; 5,717,781; 5,675,962; 5,649,410; 5,640,464; 5,568,715; and 5,500,732, which are hereby incorporated by reference in their entirety. However, the third discrimination feature using intensity and intensity ratios is particularly well-suited to the system described herein.

Bubbles have an aspect ratio, which is a measure of symmetry, close to 1.0, where the aspect ratio is defined as the width divided by the height of the bubble. Bubbles also have symmetrical structures within as well. The inertial centroid (center of intensity similar to center of mass) of a bubble is almost always within one or two pixels of its geometric centroid. The inertial centroid is defined by the following equations:

Column: $Xi$=(pixel intensity)*(column position)/(Total Intensity Count)

Row: $Yi$=(pixel intensity)*(row position)/(Total Intensity Count)

The geometric centroid is its center and is defined by the following equations:

Column: $Xg$=(column start)+(Width of the bubble)/2.0

Row: $Yg$=(row start)+(Height of the bubble)/2.0

Also, bubbles have a minimum wall thickness for their size. This wall thickness is the dark ring that comprises the edge of the bubble. Holes often have very thin edges, but the thickness of a hole's edge can vary with the lens prescription, location of the hole in the lens, and the depth of the hole. In the preferred routine 100, discussed in detail below, the bubble or hole wall thickness is determined for eight search vectors, separated by 45 degrees, processing from the outside to the center and comparing the pixels to thresholds developed from the local background. For each vector, the dark pixels and bright pixels are counted, based upon their comparison to the thresholds. The dark pixels represent the thickness of the wall of the bubble or hole and the bright pixel count is used to determine the amount of loss of material, if any.

The above-described plural-spectral imaging technique provides an additional discrimination feature: the intensities of a bubble and a hole with respect to their respective local backgrounds. An important feature in the preferred embodiment of this imaging techniques is that the lens absorbs over 99% of the UV light but passes almost all of the visible light. Because of this, the contact lens appears as a gray object (lower gray scale values) and any significant loss of material in the lens will show up in the captured image as white (higher gray scale values). Using this, holes can be easily detected in the images by comparing their gray scale values to that of neighboring pixels. One limitation in this discriminate is the discovery of bubbles which act as tiny lenses and refract the visible light, causing the bubbles to appear as holes. They appear to be holes in the lens since they have brighter centers than its neighboring pixels. In view of this, preferably, the bright pixel threshold is linearly adjusted so that the dark to bright ratio threshold is relaxed to allow bright bubbles closer to the edge of the lens but to fail bright bubbles closer to the center of the lens.

With specific reference to FIG. 5, preferably, before procedure 100 is begun, the image data are processed to identify potential holes and bubbles, which are generically referred to as blobs. Any suitable procedure may be used to do this, for example, see U.S. Pat. Nos. 6,154,274; 5,995, 213; 5,943,436; 5,828,446; 5,814,134; 5,812,254; 5,805, 276; 5,748,300; 5,745,230; 5,717,781; 5,675,962; 5,649, 410; 5,640,464; 5,568,715; and 5,500,732. All these patents are incorporated herein by reference in their entirety. Typically a pixel-by-pixel analysis is performed which compares the intensities of adjacent pixels to first locate the edge of the lens and then to determine if the lens has any defects within the lens. The pixels within the lens are compared to a threshold value and if the pixel intensity is less than the threshold value, then that pixel may be a hole or a defect. Adjacent pixels having an intensity lower than the threshold value are grouped together and will be referred to as a blob. A rectangular region is defined around each blob incorporating all the pixels of the blob having intensity values less than the threshold value. At step 102 of procedure 100, the total number of blobs is compared to a threshold value; and if that number exceeds this threshold value, the lens is rejected and the routine ends. This is done on the premise that, if so many blobs are present, it is very likely that at least one of the blobs is a hole, or even if all the blobs are bubbles, these bubbles may have obscured or masked a hole in the lens. Under these circumstances, it may simply be more economical to reject the lens than to analyze all the blobs. For example, the threshold value may be 50 as shown in FIG. 5.

If the total number of blobs is less than the threshold value, the routine proceeds to analyze the blobs one at a time. Specifically, at step 104, the size of one of the blobs is compared to a minimum value that represents the smallest size a hole would likely have. If the blob is not greater than this minimum hole size, the blob is considered not to be a hole, and the routine proceeds to analyze the next blob. For the preferred system, a blob smaller than 3 pixels, 47 microns is considered not to be a hole.

In contrast, if the size of the blob is such that it could be a hole, then the routine goes to step 106 and the aspect ratio of the blob is calculated. As mentioned above, this aspect ratio is simply the width of the blob divided by its height. At step 110, this aspect ratio is compared to a range, and if the aspect ratio is outside the specified range, than the blob is identified as a hole, and the routine proceeds to analyze the next blob. If, however, the aspect ratio is within the range, the routine moves on to step 112. The aspect ratio is usually set to be within the range of 0.8 to 1.2.

It may be noted that the range to which the aspect ratio is compared at step 110 does not have to be a permanent, fixed range, but may vary from blob to blob depending on the size of the blob. For example, one value may be used for this comparison if the blob is larger than a given size, while a second value may be used if the blob is smaller than a given size. Also, if the blob is smaller than a given size, a comparison value may be determined as a function of the blob size. Large bubbles usually have thicker edges so the program may provide a more narrow aspect ratio range centered close to 1 to optimize differentiation of large bubbles by relying more on the analysis of their edge thicknesses.

At steps 112 and 114, several values are calculated. In particular, at step 112, two threshold values are calculated. A first of these, referred to as the hole threshold, represents a background relative intensity for comparison for pixels inside the blob; and the second value, referred to as the ring threshold, represents a background relative intensity for comparison for pixels on the edge, or ring, of the blob.

For each blob processed, an estimation of the local background is performed to support a better determination of thresholds used for evaluating the blob size, shape, and characteristics. The thresholds determined from the local background include a hole threshold, a ring threshold, and a debris threshold. The hole threshold is used to identify partial holes where the blob interior is not at saturated levels, but is brighter than the local background gray levels. The blob wall threshold is used to evaluate the potential bubble wall thickness since a bubble image appears as a dark circular ring shape much like a donut. The bubble interior is usually similar in intensity to its local background levels, but bubble blobs usually exhibit a dark ring, which is significantly darker than the local background levels. A threshold is also determined separately for debris, which typically are darker than the bubble wall intensities. The use of the local background to set these thresholds means that the processing will be more adaptive and each blob processed will be better characterized.

Any suitable procedure may be used to determine an appropriate local background value for each blob. Preferably, this value may be based on the intensity values of the pixels in a defined area neighboring the blob and inside the rectangle that defines the analysis area for the blob. Using this just-determined background value, BgMean, the hole ring, and debris threshold values may be calculated by the equations:

$$holeThrs = BgMean + (C\_smHTFactor * BgSigma)$$

$$ringThrs = BgMean + (C\_smDTFactor * BgSigma)$$

Where BgMean is the mean intensity value of the pixels in a given area, BgSigma is the standard deviation of these pixel intensity values from the mean, and C_smHTFactor and C_smDTFactor are parameters. These parameters are empirically derived by an iterative process for a system using images of contact lenses that are known to have holes and bubbles in the images.

At step 114, a blob gradient value (described below as a first derivative in two-dimensions)for each pixel of the blob is determined. An important part of the initial blob analysis, preceding step 102, i.e. preceding the bubble processing software shown in the flow diagram in FIG. 5, is the determination of the blob edges by calculating its first derivative in two-dimensionals or gradients. These gradients are used to track the exterior and interior edges to form a blob for later processing. However, these gradient values are replaced in the initial blob analysis with pixel color coding which is used to stitch neighboring pixels together into one contiguous blob. As a part of the bubble identification process, the blob edge gradients are reevaluated at step 114. The blob gradient reevaluation is comprised of calculating the first derivatives in two-dimensions for an increased area size for each blob (2 additional pixels on each side of the initial blob rectangular region) in an attempt to enhance weak edges that may have been overlooked by the initial blob analysis that was done prior to step 102 when the blobs were located. While the blob gradient is recalculated, the gradient mean and standard deviation is calculated. The gradient threshold is determined to be the gradient mean minus one gradient standard deviation. The gradient threshold is utilized in later processing to determine the blob size, aspect ratio, symmetry, and blob wall (ring) thickness, which are used to classify the blob as a bubble or a defect. In the initial blob analysis, performed before step 102 in the bubble identification software, is a static gradient threshold is used in the blob analysis. By calculating a local gradient threshold for each blob in the bubble processing software, a better assessment of the blob characteristics can be performed.

After steps 112 and 114, the routine determines, at step 116, whether the blob is small or large. This is done by comparing the size of the blob to a predetermined parameter. If the size is less than this constant, the blob is considered small, and the routine proceeds to step 120; and if the blob size is greater than this constant, the blob is considered large and the routine move to step 122.

Small blobs, which are smaller than the value specified by the parameter C_bubMinBlob, for example blobs having a pixel area greater than 15, and which have an aspect ratio within the specified range of the parameter C_smBubRat, are evaluated to determine if they have bright pixels characteristic of small holes. Also, the ratio of dark pixels to all pixels (determined by comparison of pixel intensities to the hole and ring thresholds calculated from the local background (for each blob)) is compared to the parameter C_minDPPer. If the dark pixels to total pixels within the blob is greater than C_minDPPer, then the blob is a bubble or a small partial hole. C_minDPPer is determined empirically for a given system and lens. For the present system it has a value of 52.

At step 120, the ratio of dark pixels to all pixels is calculated, and then, at step 124, this ratio is used to determine whether the blob is a hole or a bubble. More specifically, at step 124, two criteria must be met in order for the blob to be identified as a bubble. The first criterion is that the ratio of dark to total pixels must satisfy a given condition. For example, this condition may be that the ratio of dark to total pixels be greater than a defined value. It should be noted that this defined value may be a function of other factors such as the size of the blob. The second criterion applied at step 124 is whether the total number of bright pixels is less than a given number such as two. If both of the criteria applied at step 124 are met, the blob is identified as a bubble, and otherwise the blob is determined to be a hole.

At step 120, any suitable test or tests may be used to identify pixels as dark or bright. For instance, those pixels whose intensity values are less than a first, given value may be considered as dark, while the pixels whose intensity values are greater than a second value may be considered as bright. For the present system, it is preferred that a dark pixel is a pixel having an intensity value less than the ring threshold, ringThr, and a bright pixel is a pixel having an intensity value greater than the hole threshold, holeThr.

If, at step 116, the blob is determined to be a large blob, the routine proceeds from step 116 to step 122, where the size of the blob is compared to a given value (which is a parameter with a default value of 11000 pixels square), which represents the maximum size of a bubble. If the blob is not smaller than this value, the blob is identified as a hole. However, if the blob is smaller than this size, the routine moves to step 126, where the thickness of the ring, or outside edge, of the blob is determined.

Larger blobs have their wall thickness evaluated to determine if they exhibit the characteristic trait of bubbles in that they resemble a donut. The blob wall thickness is determined, at step 126, along each of eight search vectors, separated by forty-five degrees, processing from outside the blob to the center, and comparing the intensity values for pixels on the vector to hole and ring thresholds calculated from the local background for each hole. Along each vector, the dark pixels and bright pixels are counted, based on their comparison to the ring or hole thresholds. The dark pixels represent the thickness of the wall (edge or ring) of the blob, and the bright pixel count may be used to determine the amount of loss of material, if any.

At step 130, the number of vectors that extend through a wall thickness greater than a given number of pixels above a minimum thickness, e.g. greater than two pixels, is compared to a given value, C_bubNEdge. If the blob fails this test, then the blob is classified as a hole (defect). If the blob has an acceptable number of test vectors, then it is further processed to determine if it is a bubble.

If a blob passes the ring vector test in step 130, then its pixels are compared to additional thresholds determined from the local background and counted. Also the geometric mean and pixel weighted mean are determined. The additional threshold values are:

darkthr=BgMean−(darkfac*BgSigma)

brightthr=BgMean+(holefac*BgSigma)

verybrightthr=holeThr

As described above the parameters darkfac and holefac are determined empirically as described earlier.

At step 132, counts are made of the number of pixels inside the blob that are dark, bright, and very bright. Specifically, to do this, the gray level values for the pixels are compared to the three threshold values just defined, representing dark, bright and very bright values. If a pixel's gray level value is less than the dark threshold value (darkThr), the pixel is considered to be dark. If a pixel's gray level value is greater than the bright threshold value (brightThr), the pixel is considered to be bright; and if a pixel's gray level is greater than the very bright threshold value (verybrightThr), the pixel is considered to be very bright. With this procedure, it may be noted, a pixel that is very bright is also counted as a bright pixel.

At step 134, the routine checks to determine if the blob has any bright pixels. If not, the blob is considered to be a bubble; while if the blob has any bright pixels, the routine proceeds to step 136 to test if the blob is a bubble that has a bright center because the bubble is acting as a lens. At this step, an assessment is made, based upon the number of dark and bright pixels and a comparison of the geometric center and the inertial centroid that was described earlier and may be referred to as a pixel weighted mean, to determine whether the blob is a bubble, hole, debris, or some other type of defect. When bubbles exhibit bright pixels in their center region, their inertial centroid is typically very close to their geometric centers, whereas holes often will appear to have skewed inertial centroids when compared to their geometric centers. Debris is usually also nonsymmetric and will also fail this test.

At step 140, the distance between the inertial centroid and geometrical center is compared to a defined value, which may be a constant, or may be determined according to a defined function. If this distance is not less than the defined value, the blob is considered to be asymmetrical and is thus considered to be a hole. However, if the distance between the inertial and geometric centroids is less than the defined value, the blob is considered to be symmetrical. The blob may be a bubble, and the routine moves on to step 142.

At this step 142, the routine checks to see if the ratio of dark pixels to bright pixels indicates whether the blob is a bubble. To do this, the routine compares that ratio to a defined value, which may be a parameter or which may be calculated according to a defined function. If the ratio of dark to bright pixels is less than the defined value, the blob is considered to be a bubble, but if this ratio is not less than the defined value, the blob is considered to be a hole. The defined value is preferably approximately 5.

With the preferred embodiment of routine 100 shown in FIG. 5, all the blobs may be analyzed, even though the presence of one hole may be sufficient to reject the lens. It is preferred that all the blobs be analyzed as this may provide useful information about the procedure used to make the lens.

Figure 6:
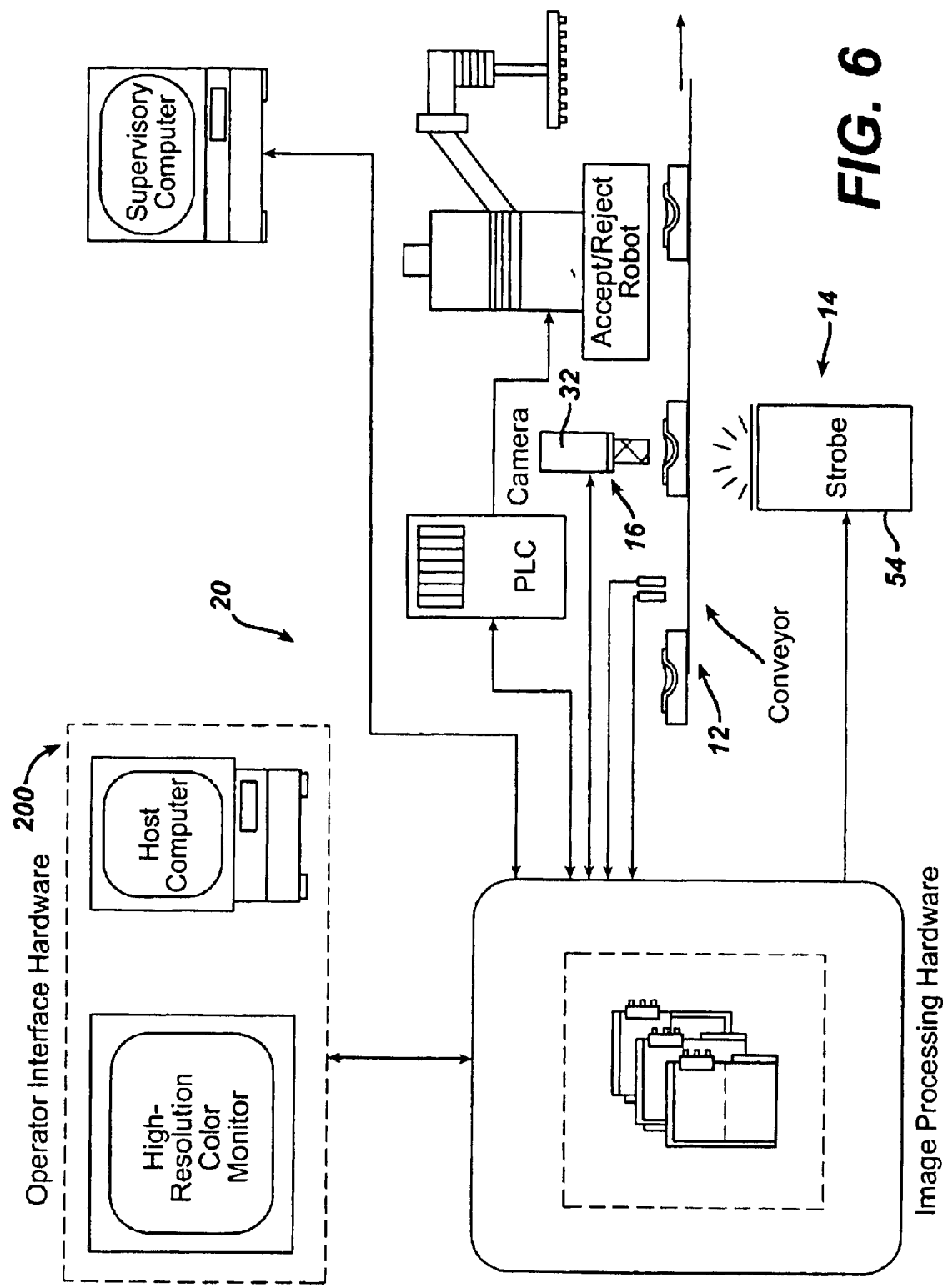
FIGS. 6 and 7, which are similar to FIGS. 1 and 2 respectively, show a second lens inspection system that also may be used in the practice of this invention.
Figure 7:
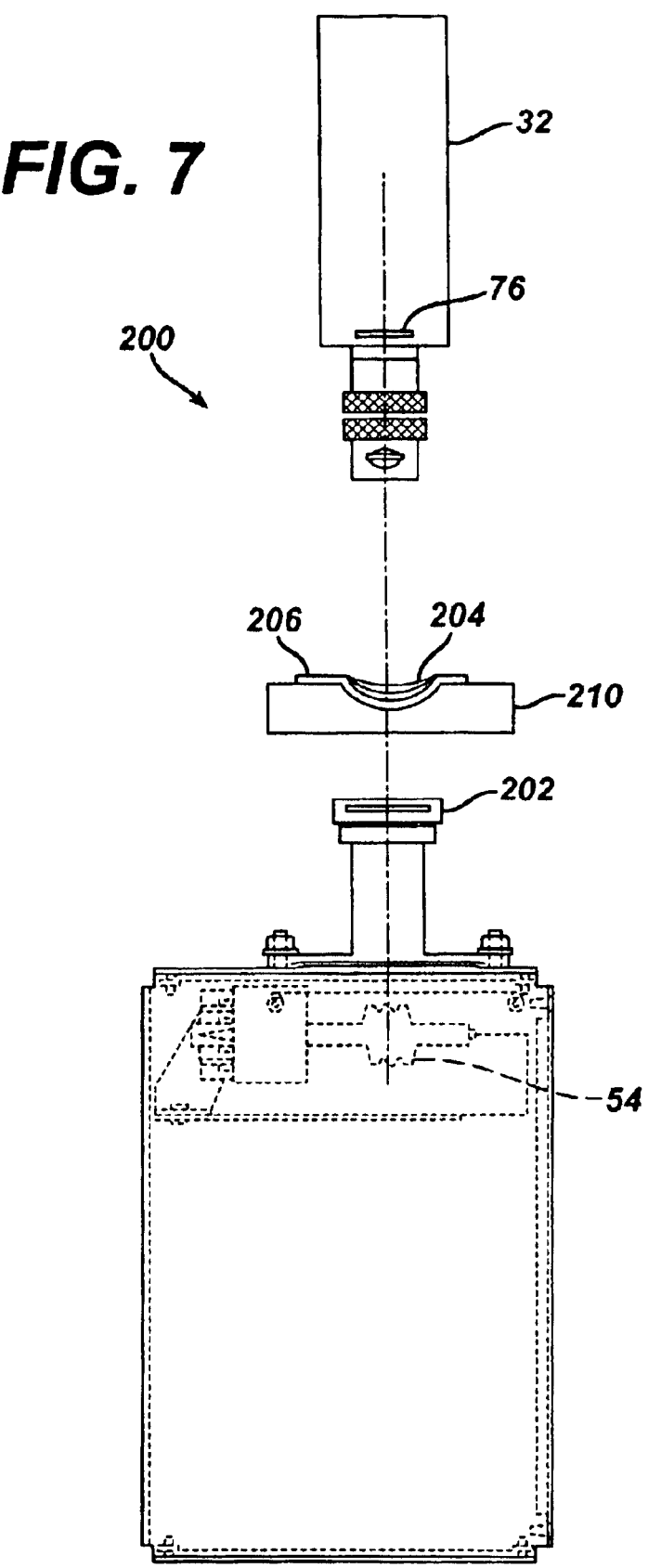

FIGS. 6 and 7 illustrate an inspection system 200 embodying an alternate system and method of this invention. As will be appreciated, FIGS. 6 and 7 are similar to FIGS. 1 and 2, respectively, and like reference numbers in the Figures identify identical or counterpart subsystems or elements. Thus, system 200 of FIGS. 6 and 7 comprises transport subsystem 12, illumination subsystem 14, imaging subsystem 16 and processing subsystem 20. With particular reference to FIG. 7, in system 200, the illumination subsystem includes xenon strobe 54, and the imaging subsystem includes camera 32, which includes CCD array 76. The difference between the system shown in FIG. 1 and FIG. 6 is that the contact lens is shown as being inspected in a mold half or front curve mold 206, instead of the final package as described for the system shown in FIGS. 1 and 2. This system using light that is partially transmitted and partially absorbed is particularly useful, because it can be used to inspect thick and thin contact lenses, as compared to other systems, particularly an inspection system using uv light alone, that can be used to inspect thin lenses, but cannot create an image through a thick lens.

As will be understood by those skilled in the art, system 200 is designed to inspect a molded contact lens, which was molded between two mold sections, shortly after one of the mold sections is removed. The lens is left in the remaining mold section 206, which then carries the lens through the inspection system. In the vast majority of times, the two mold sections are pulled apart without affecting the lens. However, on some occasions as the mold sections are pulled apart, a lens may be slightly pulled away from the remaining mold section. This is not a defect in the lens. However, typical prior art automated lens inspection systems are not able to distinguish effectively between a lens that has pulled away from a mold section and a lens that holes or tears, which are defects.

Therefore the invention includes a method of inspecting an optical device comprising (a) illuminating the center zone of said optical device with light having a first bandwidth;
(b) illuminating the edge of said optical device with light having a second bandwidth;
(c) transmitting the light of step (a) and step (b) through said optical device and capturing said light on a photo-sensitive pixel array;
(d) reading the pixels generated from step (c) to inspect said optical device.

As used herein, the terms optical device and photo-sensitive pixel array have their aforementioned meanings and preferred ranges. The term "center zone" refers to area of said optical device that concentrically extends from the geometric center of the optical device of said optical device to a radius of no greater than about 1 millimeter from the edge of said optical device. As used herein, the term "edge" refers to the area of said optical device that concentrically extends from the perimeter of said optical device and ends at said center zone. For example if said optical device is a contact lens having a diameter of 12.6 millimeters the center zone is the area, extending from said the geometric center 5.3 millimeters when measured along the radius. The edge of this contact lens is 6.3 millimeters measured along this radius.

As used herein the phrase "light having a first bandwidth" refers to light having a wavelength that illuminates defects such as hole, bubbles, tears, and debris in optical devices. Preferably said light having a first bandwidth is in the visible range, (about 370 nm to about 410 nm), however, said light having a first bandwidth may comprise light in the visible range and the ultraviolet range. For example light having a first bandwidth may have a first wavelength band and a second wavelength band as said terms are defined herein. The phrase, "light having a second bandwidth" refers to light having a wavelength that does not produce any image feature resulting form a slight separation of the lens edge from the mold carrier. It is preferred that said light having a second bandwidth be in the ultraviolet region of the spectrum (about 330 nm to about 367 nm).

Still further the invention includes a method of inspecting an optical device comprising (a) illuminating the center zone of said optical device with light having a first bandwidth;
(b) illuminating the edge of said optical device with light having a second bandwidth;
(c) transmitting the light of step (a) and step (b) through said optical device and capturing said light on a photo-sensitive pixel array;
(d) producing an image of said optical device.

As used herein, the terms optical device, photo-sensitive pixel array, image, center zone, edge, light having a first bandwidth and light having a second bandwidth have their aforementioned meanings and preferred ranges.

Yet still further the invention includes an apparatus for inspecting an optical device comprising (a) a means for illuminating the center zone of said optical device with light having a first bandwidth;
(b) a means for illuminating the edge of said optical device with light having a second bandwidth;
(c) a means for transmitting the light of step (a) and step (b) through said optical device and capturing said light on a photo-sensitive pixel array;
(d) a means for reading the pixels generated from step (c) to inspect said optical device.

As used herein, the terms optical device, photo-sensitive pixel array, image, center zone, edge, light having a first bandwidth and light having a second bandwidth have their aforementioned meanings and preferred ranges.

As used herein said means for illuminating said center zone include but what are not limited to transmitting light from a light source through a first filter element, wherein said filter transmits light that shows holes and tears in said optical device. Preferably said first filter element transmits light in the visible range of the spectrum, more preferably about 370 nm to about 410 nm. As used herein means for illuminating said edge include but are not limited to transmitting light from a light source through a second filter element, wherein said filter does not produce an image feature resulting from a slight separation of the lens edge from the mold carrier. Preferably said second filter element transmits light in the ultraviolet region having a wavelength of about 330 nm to about 367 nm. This invention is illustrated in more detail in reference to the following figures and description.

Figure 8:
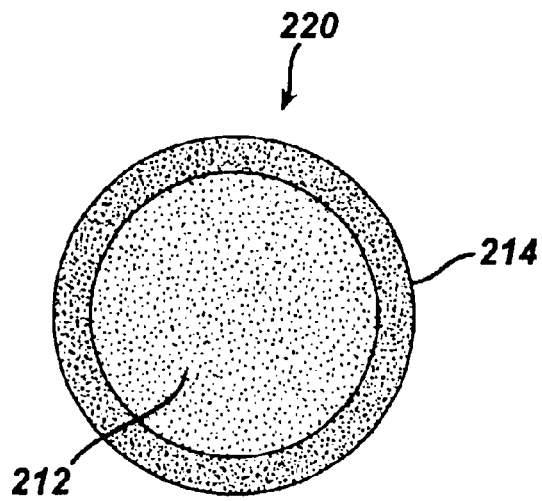
FIG. 8 illustrates filter elements that may be used to provide a second spectral masking technique, which may be used to illuminate a lens in the inspection system of FIGS. 6 and 7.

In an alternative preferred embodiment of the system shown in FIGS. 6 and 7, system 200 can be modified to exchange the filter device 202 located between the light source 54 and the lens 204 to with another filter device be 220 shown in FIG. 8. Alternatively, the filter device, 220, could be located between the lens 204 and the camera.

With the filter device 220, system 200 is designed to avoid rejecting lenses simply because they are delaminated. Generally, this is done by utilizing the fact that most holes and tears in lenses occur in the central regions of the lenses, while the effect of a lens that has pulled away from the mold carrier 206 is apparent primarily in the peripheral area of the lens. More particularly, the illumination subsystem of system 200 is designed and operated to form an image on pixel array 76 that effectively shows holes or tears in a lens without also showing any effects resulting from slight separation of the lens from the mold carrier.

Preferably this is done by illuminating the central region of a contact lens 206 with light in at least one bandwidth that shows holes or tears in the lens, and illuminating the outer regions of the lens with light in a second bandwidth that does not produce any image feature resulting from a slight separation of the lens edge from the mold carrier. This, in turn, is accomplished by positioning filter device 220 in the path of the illumination light beam, between light source 54 and lens 204.

Filter device 220 comprises a holder or a body member, and a first and a second filter elements, which are securely held in the body member. With particular reference to FIG. 8, a first filter element 212 has a circular shape, and a second filter element 214 has a larger circular shape and is positioned so that 214 is concentric with said first filter element 212 so that said second filter element, 214 overlaps with said first filter element 212, and also has an annular shape that extends beyond the circumference of filter element 212. Alternatively, a circular first filter element and an annular second filter element could be used to achieve the same effect.

Filter device 220 is positioned in system 200 so that light that passes through the central portion of the lens 204 passes through said first filter element 212, and light that passes through the outer peripheral portion of the lens 204 has passed through said second filter element 214. Moreover, preferably, none of the light that passes through said first filter element 212 passes through the outer lens region, and, similarly, none of the light that passes through said second filter element 214 passes through the central lens region.

Filter elements 212 and 214 may transmit any suitable bandwidths. For instance, said second filter element 214 transmits light in the ultra violet region of the spectrum, preferably at approximately 340 nm or 357 nm (+/− 10FWHM) to provide ultraviolet style illumination for the lens periphery. Said first filter element 212 transmits light mostly in the visible region, but can transmit light in the first wavelength band, 86, and the second wavelength band, 88 as shown in FIG. 3. By narrowing the bandwidth of light that is able to be transmitted to the outer portions of the lens and ultimately to the CCD array, the image of the outer portions of the lens is a darker image that masks artifacts of delamination.

Figure 9:
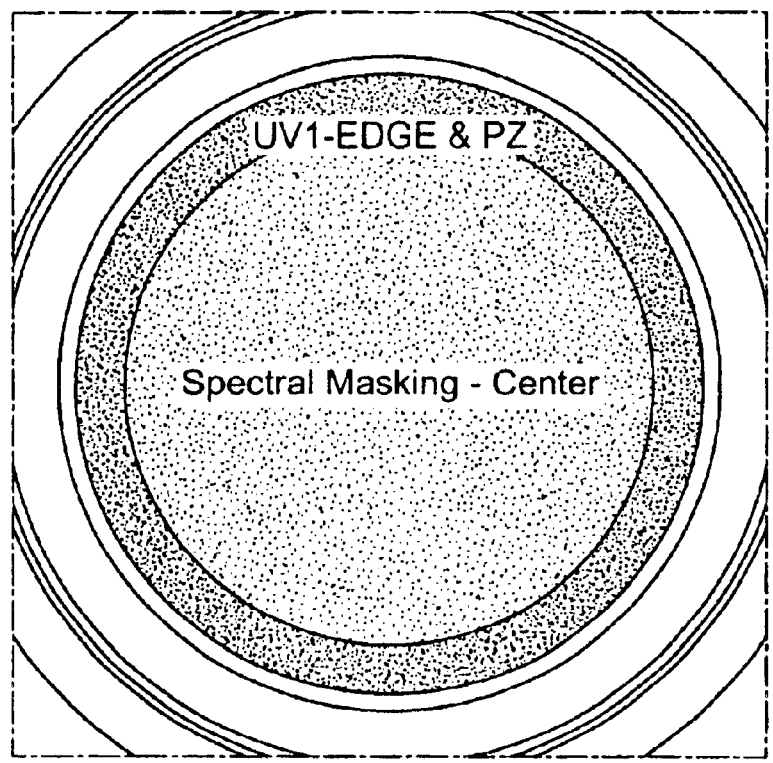
FIG. 9 shows a lens image made using the second spectral masking technique.

FIG. 9 illustrates a lens image formed on pixel array 76 of system 200. Any suitable image analysis algorithm may be used to analyze the pixel data to determine if the lens is acceptable. A significant advantage of this aspect of the invention is that existing image analysis algorithms can be used to determine whether the lens has holes or tears. This is due to the fact that the use of uv light only on the edge of the lens masks the artifacts of the demold process that appear as delamination. spectral masking technique employed in system 200 eliminates, or at least substantially reduces, the likelihood that a feature appears on pixel array 76 due to lens separation from the mold carrier. Thus, algorithms can accurately identify lenses that have holes or tears even if the algorithm is not able effectively to distinguish between such lenses and a lens whose edge has separated from the mold carrier.

As will be appreciated by those of ordinary skill in the art, system 10, routine 100 and system 200 may be used to inspect a large variety of types and sizes of optical lenses and other optical devices, and systems 10 and 200 are particularly well suited for inspecting contact lenses. Further, the plural-spectral imaging procedures disclosed herein can also be applied to other objects using various combinations of the spectrum depending upon the absorption/transmission characteristics of the object to be inspected and/or packaged in the system. Other objects that can be inspected using this invention include spectacle lenses, camera lenses, optical filters, thin films, and glass.

Additional aspects of the invention disclosed herein include but are not limited to the following. A method of reading pixels generated from photo-sensitive array to evaluate the whether an optical device comprises a hole, by using the degree of symmetry, a wall thickness, and the gray scale values of said optical device. A program storage device readable by machine, tangibly embodying a program of instructions executable by the machine to perform method steps for processing image data representing an optical device which distinguishes defined characteristics of said optical device.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of inspecting optical devices comprising:
   (a) illuminating the optical device and a surrounding background with light, wherein said light comprises a first wavelength band and a second wavelength band, wherein said first wavelength band and said second wavelength band are different wavelengths, and wherein said first wavelength band has a first intensity and said second wavelength band has a second intensity;
   (b) transmitting said light through said optical device wherein the majority of said first wavelength band is absorbed by said optical device and the majority of the second wavelength band is transmitted through said optical device, and capturing said optical device transmitted light on a photo-sensitive pixel array;
   (c) transmitting said light through said surrounding background wherein the majority of said first wavelength band and said second wavelength band are transmitted, and capturing said background transmitted light on a photo-sensitive array;
   (d) reading pixels generated from step (b) and step (c) and comparing the gray scale values of said reading, wherein the difference between the grayscale values of the pixels generated from said background transmitted light and from said optical device transmitted light is of sufficient value to distinguish between holes in said optical device and bubbles in said surrounding background.

2. The method of claim 1 wherein said first wavelength band is absorbed by the optical device at about 80% to about 100%.

3. The method of claim 1 wherein said first wavelength band is absorbed at about 98% to about 100%.

4. The method of claim 1 wherein said first wavelength band is about 340 nm to about 360 nm.

5. The method of claim 1 wherein said second wavelength band is transmitted at about 80% to about 100%.

6. The method of claim 1 wherein said second wavelength band is transmitted at about 98% to about 100%.

7. The method of claim 1 wherein said second wavelength band is about 385 nm to about 405 nm.

8. The method of claim 1 wherein the ratio of the intensity of said first intensity to said second intensity is about 2:1.

9. The method of claim 1 wherein the ration of said first intensity to said second intensity is about 1.5:1.

10. The method of claim 1 wherein the difference between the gray scale of the surrounding background and a defect free region of said optical device is about 120 to about 180.

11. The method of claim 1 wherein the difference between the gray scale of the surrounding background and a defect free region of said optical device is about 140.

12. The method of claim 1 wherein the intensity of the light that is transmitted in step (b) and step (a) and incident on said photo-sensitive pixel array is further adjusted so that the captured image of a defect free region of the optical device is in the mid range of the sensitivity for the photo-sensitive pixel array.

13. The method of claim 1 wherein said first wavelength band and said second wavelength band are produced by one source of light and one or more appropriate filters.

14. A method of inspecting optical devices comprising steps of:
  (a) illuminating the optical device and a surrounding background with light, wherein said light comprises a first wavelength band and a second wavelength band; wherein said first wavelength band and said second wavelength band are different wavelengths, and wherein said first wavelength band has a first intensity and said second wavelength band has a second intensity;
  (b) transmitting said light through said optical device wherein the majority of said first wavelength band is absorbed by said optical device and the majority of the second wavelength band is transmitted through said optical device, and capturing said optical device transmitted light on a photo-sensitive pixel array;
  (c) transmitting said light through said surrounding background wherein the majority of said first wavelength band and said second wavelength band are transmitted, and capturing said background transmitted light on a photo-sensitive pixel array;
  (d) producing an image of said optical device and said surrounding background wherein the difference between the gray scale value of the image produced by step (c) and step (b) is of sufficient value to distinguish between holes in said optical device and bubbles in said surrounding background.

15. The method of claim 14 wherein said first wavelength band is absorbed at about 98% to about 100%.

16. The method of claim 14 wherein said second wavelength band is transmitted at about 80% to about 100%.

17. The method of claim 14 wherein said second wavelength band is about 385 nm to about 405 nm.

18. The method of claim 14 wherein the ration of said first intensity to said second intensity is about 1.5:1.

19. The method of claim 14 wherein said first wavelength band and said second wavelength band are produced by one source of light and one or more appropriate filters.

20. A method of inspecting an optical device comprising steps of:
  (a) illuminating the center zone of said optical device with light having a first bandwidth;
  (b) illuminating the edge of said optical device with light having a second bandwidth;
  (c) transmitting the light of step (a) and step (b) through said optical device and capturing said light on a photo-sensitive pixel array; and
  (d) reading the pixels generated from step (c) to inspect said optical device.

21. The method of claim 20 wherein said center zone extends up to 2 millimeters from the edge of said optical device.

22. The method of claim 20 wherein said center zone extends up to 4 millimeters from the edge of said optical device.

23. The method of claim 20 wherein said light having a first bandwidth comprises visible light having a wavelength of about 370 nm to about 405 nm.

24. The method of claim 20 wherein said light having a second bandwidth comprises ultraviolet light having a wavelength of about 330 nm to about 367 nm.

25. An apparatus for inspecting an optical device comprises:
  (a) a means for illuminating the optical device and a surrounding background with light, wherein said light comprises a first wavelength band and a second wavelength band,
    wherein said first wavelength band and said second wavelength band are different wavelengths, and
    wherein said first wavelength band has a first intensity and said second wavelength band has a second intensity;
  (b) a means for transmitting said light through said optical device wherein the majority of said first wavelength band is absorbed by said optical device and the majority of the second wavelength band is transmitted through said optical device, and capturing said optical device transmitted light on a photo-sensitive pixel array;
  (c) a means for transmitting said light through said surrounding background wherein the majority of said first wavelength band and said second wavelength band are transmitted, and capturing said background transmitted light on a photo-sensitive pixel array;
  (d) a means for reading pixels generated from step (b) and step (c) and comparing the gray scale values of said reading, wherein the difference between the grayscale values of the pixels generated from said background transmitted light and from said optical device transmitted light is of sufficient value to distinguish between holes in said optical device and bubbles in said surrounding background.

26. An apparatus for inspecting an optical device comprising:
  (a) a means for illuminating the center zone of said optical device with light having a first bandwidth;
  (b) a means for illuminating the edge of said optical device with light having a second bandwidth;
  (c) a means for transmitting the light of step (a) and step (b) through said optical device and capturing said light on a photo-sensitive pixel array; and
  (d) a means for reading the pixels generated from step (c) to inspect said optical device.

27. The apparatus of claim 26 wherein said means for illuminating said center zone comprises a light source and a first filter element wherein said element transmits light in the visible region.

28. The apparatus of claim 26 wherein said means for illuminating said edge comprises a light source and a second filter element wherein said element transmits light in the ultraviolet region.

* * * * *